Figure 1:
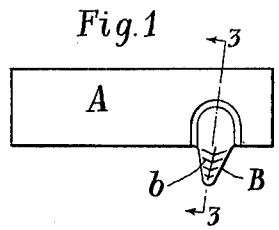

W. J. KENT.
TOE CALK.
APPLICATION FILED MAR. 25, 1911.

1,012,364.

Patented Dec. 19, 1911.

WITNESSES:
David J. Walsh
Guy W. Hodges

INVENTOR:
William J. Kent,
By Attorneys,
Fraser Turk & Miller

UNITED STATES PATENT OFFICE.

WILLIAM J. KENT, OF NEW YORK, N. Y.

TOE-CALK.

1,012,364.  Specification of Letters Patent.  Patented Dec. 19, 1911.

Application filed March 25, 1911. Serial No. 616,938.

*To all whom it may concern:*

Be it known that I, WILLIAM J. KENT, a citizen of the United States, residing in the borough of Brooklyn, county of Kings, city and State of New York, have invented certain new and useful Improvements in Toe-Calks, of which the following is a specification.

This invention relates to toe-calks for horse shoes, and aims to provide a new and improved calk and a novel method of making the same.

The form of toe-calk now most commonly used comprises an elongated piece of iron or steel of rectangular or other appropriate cross section, which is designed to be welded to the toe of a horse shoe. In order to facilitate the welding operation, such calks are provided with a so-called " nib " which comprises a sharpened projection designed to be driven into the horse shoe when the latter is heated, whereby to temporarily hold the parts together during reheating and until the actual welding of the parts is effected. In the type of calk most largely used the nib is formed by swaging or hammering the extreme end of the calk until a portion of the metal is shaped into a sharpened projection extending at an angle from the edge of the calk. In the process of manufacture of this type of calk the metal is maintained in a heated condition, and this involves an expense which is relatively large in the production of an article which is necessarily so cheap as a toe-calk. Moreover, the heating of the metal being irregular tends to distort it with the result that there is a large percentage of unusable calks produced, and in many other cases the calk does not retain the even bearing surface which is desirable in subsequently welding it to the shoe. This bearing surface is also apt to be pitted or scaly, which also tends to interfere with the welding operation. The chief disadvantage, however, is due to the fact that the nib is formed at the extreme end of the calk, and when the latter is applied to the shoe its nib assumes such a position that it is necessarily driven into the crease of the shoe. As the shoe is already weakened at this point, it is disadvantageous to further reduce its strength by the additional hole produced by the nib. It has been attempted to avoid these objections by rolling a bar with a fin on its edge of a cross section corresponding to that of the nib, and cutting or shearing away the surplus metal from the nib between the latter and the ends of the calk. This secures the desired location of the nib, but introduces a further disadvantage in that it has been found impossible to shear the surplus parts of the fin in such a way as to leave the body of the calk with a flat bearing surface. The result is that this type of calk is apt to form a bad weld with the shoe, since the calk is not only liable to rock upon the shoe, but also leaves a space for the entrance of dust or dirt between the parts. Moreover, the calk is expensive to make since it requires a rolled bar of a special shape, and there is considerable wastage of metal due to the cutting away of the fin. By the present invention these various disadvantages are obviated.

According to the invention in its preferred form I utilize a bar of ordinary standard stock of appropriate cross section, and without the use of heating I strike up a nib from the body of the stock, preferably before the calks are severed from the bar, and preferably by a series of stamping or punching operations which form and shape the nibs from the cold metal. The individual calks may be separated from the stock at any point desired to obtain the required location of the nib between the ends of the calk; the nib may even be located at the end, although for the reasons hereinbefore stated this construction is not preferred.

Figure 2:
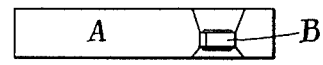
Figure 3:
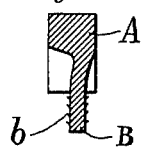
Figure 7:
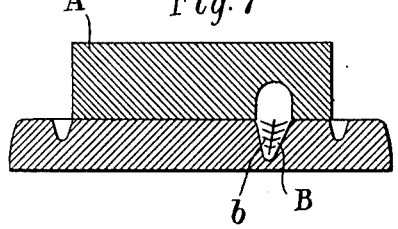
Figure 4:
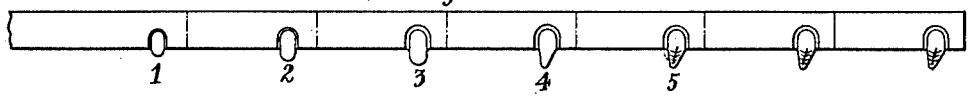
Figure 5:
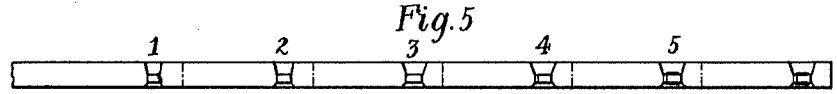
Figure 6:
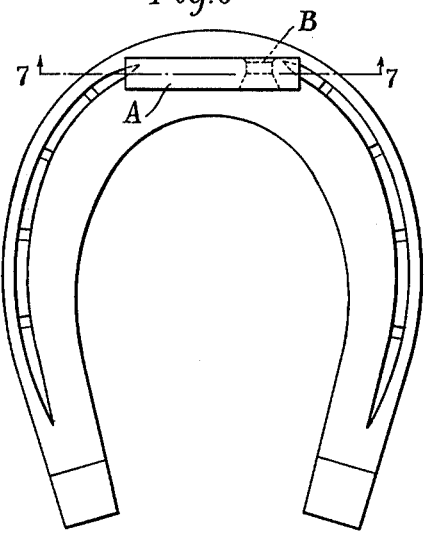
Figure 8:
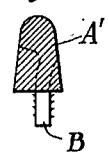
Figure 9:
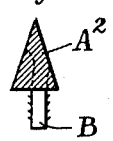

Referring to the drawings which illustrate several forms of the invention,—Figure 1 is a side elevation of a toe-calk embodying the preferred form of the invention. Fig. 2 is an under side view of Fig. 1. Fig. 3 is a cross sectional view taken on the line 3—3 in Fig. 1. Fig. 4 is a side elevation of a bar of metal showing the successive steps in forming the nib. Fig. 5 is an under side or edge view of Fig. 4. Fig. 6 is an under side view of a horse shoe showing my improved calk applied thereto. Fig. 7 is a cross sectional view taken on the line 7—7 in Fig. 6. Fig. 8 is an end view of a modified shape of calk. Fig. 9 is a similar view of another modification.

Referring to the drawings let A indicate the body of the calk which as shown in Figs. 1 to 7 comprises an elongated piece of steel of rectangular cross section, forming what is known in the trade as a " blunt " calk.

The shape of the body A, however, is not essential since it may be given any desired conformation, as for instance that shown at A' in Fig. 8 which represents a so-called half sharp calk, or at A² Fig. 9 which illustrates a so-called sharp calk. Whatever the shape of the body A, it is provided with a projection or nib B which as before stated is preferably located between the ends of the body A on the under side or edge of the latter. The exact point of location of the nib B is not material, and may be varied considerably. It is important, however, that the nib shall be displaced so far from the end of the body A that it will enter the solid metal of the shoe for which it is intended rather than the nail crease of the shoe. This is illustrated in Figs. 6 and 7 from which figures it will be seen that when the calk is in position the nib passes through the solid or uncreased toe portion of the shoe. A feature of importance in the present invention is the provision of a corrugated or roughened surface upon the face of the nib B, the corrugations being designated by the letter $b$. Such corrugations, which are most effective if upon both faces of the nib, are most useful in resisting separation of the calk and shoe after the nib is driven into the latter, so that there is no danger of disengagement or slippage of the calk during the subsequent welding operation. The corrugations being upon the broad and nearly flat face or faces of the nib are closely gripped by the hot metal of the shoe, and are much more effective than sharp spurs or shoulders on the thin edges of the nib, which are liable to be effaced by the hot metal in driving the nib into the shoe. The corrugating or roughening of the face of the nib is transverse to the projection of the nib in that the effective portions or shoulders formed by the roughening are presented transversely to any strain tending to pull the nib out of the shoe.

According to the present invention the calk is formed from a body of cold metal by a series of swaging or stamping operations, and preferably from a bar of low grade steel of rectangular cross section, such as is commonly used for other purposes and which need not be specially rolled. By such swaging operations, which are indicated by the reference numerals 1, 2 and 3 in Figs. 4 and 5 the sides of the stock are indented or forced inwardly, the metal at or near the point of swaging flowing in a laterally outward direction beyond the edge of the stock and forming a projection which is subsequently shaped to pointed form as shown at 4, preferably by dies which act against its front and rear edges. The nib is preferably flattened as shown in the direction of the length of the calk. After being shaped the nib is acted upon by a suitable die and punch of proper configuration to corrugate the nib. Preferably the corrugations are formed on both flat sides of the nib, as indicated at $b$. Preferably the corrugating dies perform the fifth operation upon the blank as indicated at 5 in Fig. 4. The finished calk is then sheared off at the proper point to leave the nib in the selected position relatively to the ends of the calk. It will be observed that in forming the nib a localized part of the metal of the body portion is indented, preferably on both sides, whereby it is forced laterally outward to form the nib. It is important that the metal be so swaged that the nib is spaced apart from both sides of the calk, since this largely prevents the nib from bending during the operation of driving it into the shoe. This position of the nib is attained in the construction shown by indenting both sides of the calk and forcing the metal outwardly between its sides, as best seen in Figs. 2 and 3.

Preferably the several swaging and shaping operations are performed in a single automatic machine having a gang of punches and dies acting simultaneously so that at each cycle of operations of the machine a calk is finished and severed from the end of the bar. Such a machine is described and claimed in an application filed by me on the 25th day of March, 1911, to which application reference is made for a more complete description of the machine. By the use of such a machine the calks provided by this invention can be very rapidly and economically manufactured.

It will be observed that by the present invention a preliminary heating of the bar is not necessary. On the contrary the present process produces a calk of superior strength and toughness, particularly so far as the nib is concerned. The successive cold swaging operations make the nib considerably tougher and harder than the body of the calk, and impart to it a grain or fiber transverse to the length of the calk, and substantially lengthwise of the nib, so that the nib is not liable to bend when being driven into the shoe. It will be apparent that by the mere adjustment of the point of shearing, the nib can be located at any point desired with reference to the ends of the calk.

Aside from the advantages hereinabove pointed out, the finished calk is free from scale or pitting and is not distorted, so that a flat, even bearing surface is provided which greatly facilitates the welding operation, as it excludes dirt or dust in the joints and brings the metals into close contact.

While I have shown and described a certain embodiment of the invention, it will be understood that various modifications may be made therein without departing from the spirit of the invention.

While the nib is shown as formed at approximately the middle of the lower edge of the calk, it will be understood that it may be displaced to either side if desired.

What I claim is:—

1. A horseshoe calk comprising an elongated body portion having two opposite indentations therein at one edge between its ends and a nib drawn or swaged out laterally from such indented portion.

2. A horseshoe calk comprising an elongated body portion having a nib drawn or swaged out laterally therefrom intermediate its ends, the nib beyond the body portion being roughened on its face.

3. A horseshoe calk comprising an elongated body portion having a flat nib projecting laterally from one edge thereof, said nib beyond the body portion being transversely roughened or corrugated on its face.

4. A horseshoe calk comprising an elongated body portion having a flat nib projecting laterally from one edge thereof, said nib beyond the body portion being substantially flat on its opposite faces and roughened or corrugated on both faces.

In witness whereof, I have hereunto signed my name in the presence of two subscribing witnesses.

WILLIAM J. KENT.

Witnesses:
 EUGENE V. MYERS,
 THOMAS F. WALLACE.

Copies of this patent may be obtained for five cents each, by addressing the "Commissioner of Patents, Washington, D. C."